(12) United States Patent
Chamberlain et al.

(10) Patent No.: US 6,417,623 B1
(45) Date of Patent: Jul. 9, 2002

(54) SINGLE WIRE AUTOMOTIVE EXTERNAL LIGHTING SYSTEM

(75) Inventors: Philip E Chamberlain, Otter Lake; John M Gaynier, Carleton, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/471,930

(22) Filed: Dec. 23, 1999

(51) Int. Cl.$^7$ .................................................. B60Q 1/02
(52) U.S. Cl. .......................... 315/82; 315/77; 315/78; 307/10.8
(58) Field of Search ............................. 315/83, 77, 78, 315/81, 80, 291, 307; 307/10.1, 10.8

(56) References Cited

U.S. PATENT DOCUMENTS 5,517,064 A  *  5/1996  Murakami ................. 307/10.1
6,118,371 A  *  9/2000  Haddad et al. ............... 315/82

* cited by examiner

Primary Examiner—Don Wong
Assistant Examiner—Jimmy T. Vu
(74) Attorney, Agent, or Firm—Edwin W. Bacon, Jr.

(57) ABSTRACT

An automotive external lighting system uses pulse width modulation to drive a single filament for turn signaling and park signaling purposes. A control circuit generates a variable brightness signal based on a predetermined brightness level, and an external lamp produces external illumination based on the brightness signal. A single wire is therefore able to electrically connect the control circuit to the external lamp. The control circuit includes a microcontroller for generating a pulse width modulated signal, and a high side driver for driving the lamp in response to the pulse width modulated signal. When the pulse width modulated signal has a duty cycle corresponding to a parking brightness level, the filament will produce less illumination than in the case of turn signaling. When the pulse width modulated signal has a duty cycle corresponding to a turning brightness level, the control circuit generates a switching signal in response to an operator manipulation, and the microcontroller controls generation of the pulse width modulated signal in response to the switching signal.

10 Claims, 3 Drawing Sheets

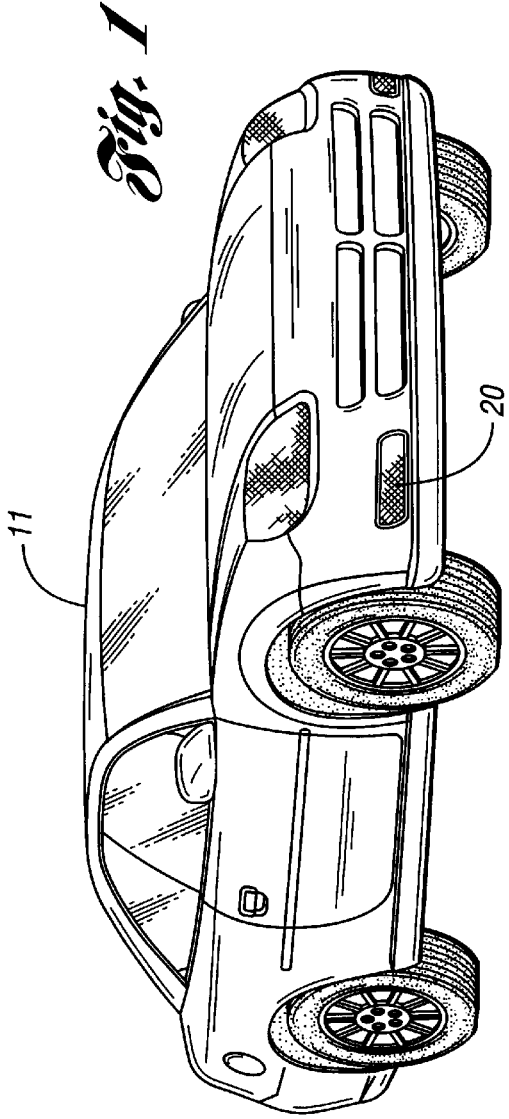
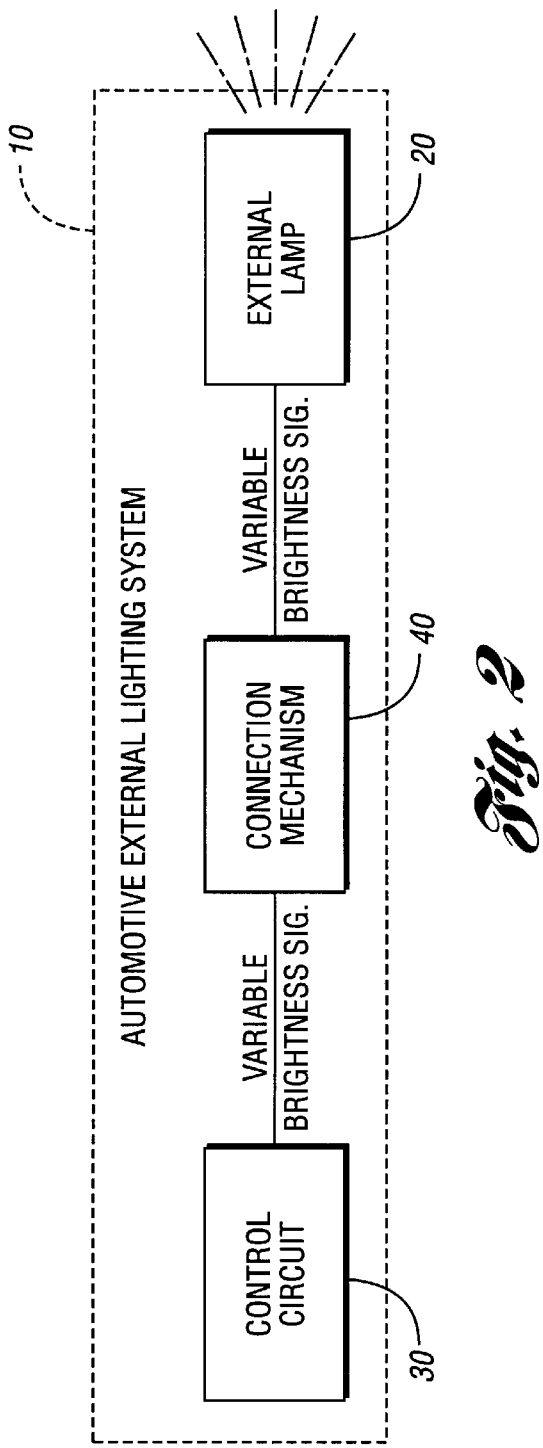

SINGLE WIRE AUTOMOTIVE EXTERNAL LIGHTING SYSTEM

BACKGROUND OF THE INVENTION

1. Field of the Invention

The present invention relates generally to automotive external lighting systems. More particularly, the present invention relates to an automotive external lighting system using pulse width modulation to drive a single filament for multiple signaling purposes.

2. Discussion

External lighting systems have been used with automobiles for many years, and continue to increase in complexity and sophistication. Such systems are used for turn signaling as well as park signaling, and generally must abide by strict industry standards. Typical industry standards specify vibration, moisture, dust, corrosion, and photometry limits. For example, it is common for photometric requirements to detail minimum illumination intensity for parking and turning functions. Thus, when a vehicle is indicating a change in direction via a flashing turn signal, a corresponding brightness must be produced so that nearby vehicles and pedestrians are adequately put on notice. Similarly, park signaling systems for clearance purposes (indicating overall width and height of the vehicle) or side marker purposes (indicating overall length of the vehicle) have corresponding required brightness levels.

Typically, turn signaling requires higher brightness levels than park signaling, due to the increased concern for safety. As a result, conventional lamps for automotive external lighting systems include a major filament and a minor filament. The major filament is used for turn signaling, whereas the minor filament is used for park signaling. A separate connection mechanism is therefore provided to each filament and a control circuit determines which filament to illuminate. A shortcoming with this approach, however, is the fact that two wires must be employed as a connection mechanism. This increases the number of parts and adds to the overall cost of the vehicle. Similarly, using multiple filaments requires more expensive lamps. It is therefore desirable to provide a system and method for producing external illumination with a single wire and lamp filament.

Conventional lighting systems also lack the ability to provide a variable brightness signal which can be customized to the particular vehicle size and photometry standards. For example, it is not uncommon for typical control circuits to provide a maximum of two current levels—one for energization of the major filament, and the other for energization of the minor filament. This has substantially limited the flexibility of external lighting systems and caused a corresponding increase of design, manufacturing and maintenance costs. It is therefore desirable to provide an automotive external lighting system that operates on a variable brightness signal such that flexibility is increased.

SUMMARY OF THE INVENTION

In accordance with the present invention, an automotive external lighting system includes a control circuit for generating a variable brightness signal based on a predetermined brightness level, and an external lamp for producing external illumination based on the brightness signal. A connection mechanism electrically connects the control circuit to the external lamp. In a preferred embodiment, the brightness signal is a pulse width modulated signal, and the control circuit includes a microprocessor for generating the pulse width modulated signal. The control signal also includes a driver for driving the lamp in response to the pulse width modulated signal.

Further in accordance with the present invention, a method for producing external illumination for an automobile includes the step of generating a pulse width modulated signal based on a predetermined brightness level. The pulse width modulated signal is electrically connected to an external lamp of the vehicle, and external illumination is produced based on the pulse width modulated signal.

Further areas of applicability of the present invention will become apparent from the detailed description provided herein. It should be understood, however, that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The invention is set forth in exemplary fashion by the following detailed description of a preferred embodiment taken in conjunction with the drawings, in which:

FIG. 1 is an isometric view of an automobile implementing the external lighting system of the present invention;

FIG. 2 is a block diagram of the automotive external lighting system of the present invention;

DETAILED DESCRIPTION OF THE PREFERRED EMBODIMENT

Figure 3:
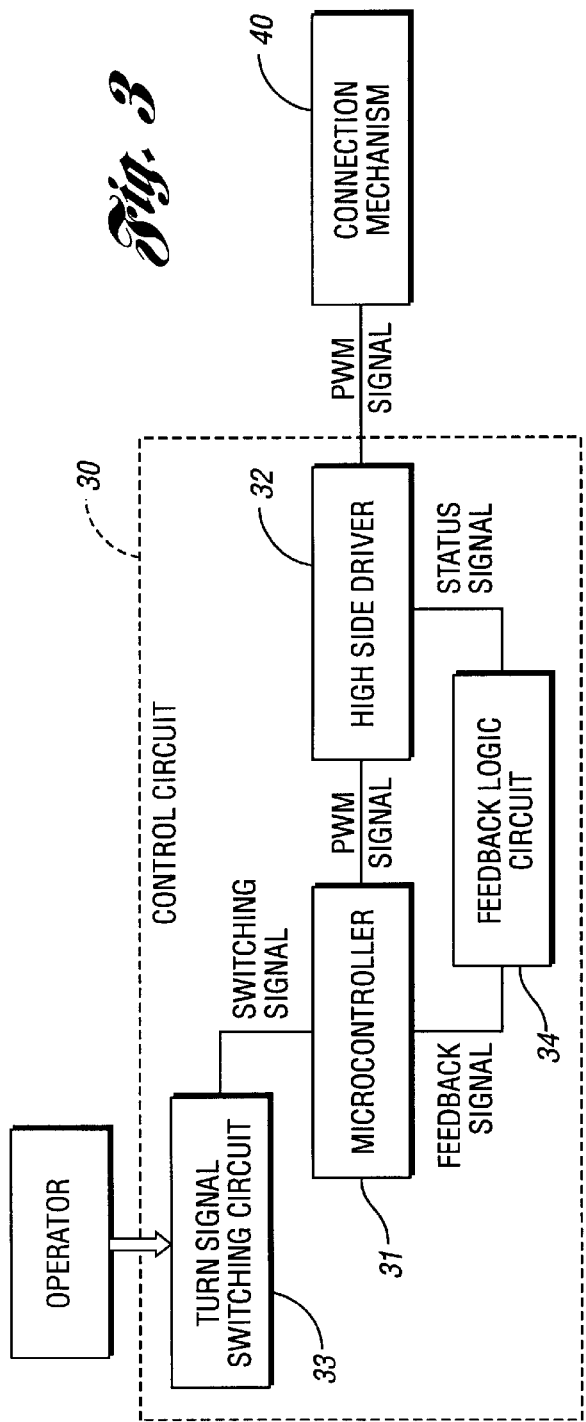
FIG. 3 is a block diagram of the control circuit of the present invention.

FIG. 1 shows an automobile 11 implementing the automotive external lighting system of the present invention. External lamp 20 produces external illumination based on a variable brightness signal. Preferably, external lamp 20 is used for turn signaling as well as park signaling. Thus, lamp 20 must produce illumination of varying intensities. As will be discussed later, lamp 20 can have either one filament or multiple filaments, but only one filament is necessary for complete operation. The elimination of one connection wire per lamp 20 has resulted in substantial cost savings per automobile 11.

Turning now to FIG. 2, the automotive external lighting system 10 of the present invention can be better understood. Specifically, lighting system 10 includes a control circuit 30 for generating a variable brightness signal based on a predetermined brightness level. Preferably, the predetermined brightness level is established by industry standards to be discussed below. External lamp 20 produces external illumination based on the brightness signal, and connection mechanism 40 electrically connects the control circuit 30 to the external lamp 20.

Figure 6:
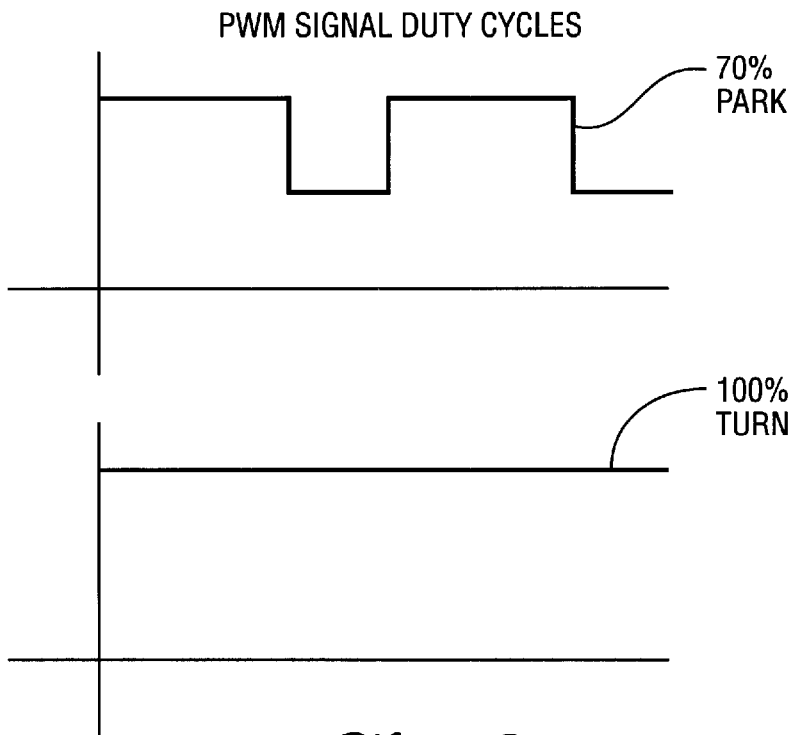
FIG. 6 is a plot of pulse width modulated signal duty cycles for park signaling and turn signaling according to the present invention.

FIG. 3 shows a preferred embodiment of control circuit 30. It will be appreciated that the brightness signal is preferably a pulse width modulated (PWM) signal, such that the duty cycle of the PWM signal determines the brightness of the illumination of lamp 20 (FIG. 2). Control circuit 30 includes a microcontroller 31 for generating the PWM signal. A driver 32 drives the lamp 20 (FIG. 2) in response to the PWM signal. Thus, for park signaling functions such as clearance or side marking, the PWM signal will have a duty cycle corresponding to a predetermined parking brightness level (FIG. 6). The predetermined parking brightness level is well defined in industry standards, and an example can be found in SAE Ground Vehicle Lighting Standards Manual, J592 JUN92, incorporated herein by reference.

With continued reference to FIG. 3, it can be seen that for turn signaling, a turn signal switching circuit 33 will generate a switching signal in response to an operator manipulation. The microcontroller 31 controls generation of the PWM signal in response to the switching signal, and the PWM signal has a duty cycle corresponding to a predetermined turning brightness level (FIG. 6). An example of standard predetermined turning brightness levels can be found in SAE Ground Vehicle Lighting Standards Manual, J914 NOV87, incorporated herein by reference. It can be appreciated that the driver 32 generates a status signal based on an operational condition of the lamp 20. Driver 32 can therefore provide protection for shorts by monitoring the operational condition of the lamp and reporting this information back to the microcontroller 31. The driver 32 can be implemented via a solid state relay such as the VN460SP Single Channel High Side Smart Solid State Relay sold by SGS-THOMPSON MICRO-ELECTRONICS. While it is preferred that a high side driver be used for connection to the high side of the major filament (discussed below), a low side driver could be connected to the low side (ground) of the major filament. The control circuit 30 further includes a feedback logic circuit 34 for providing the microcontroller 31 with a feedback signal based on the status signal.

Figure 4:
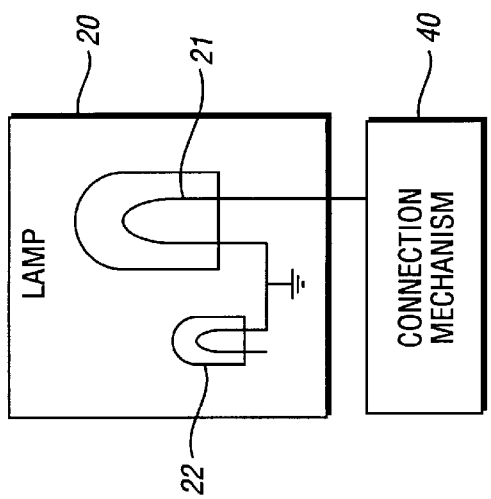
FIG. 4 is a schematic diagram of an external lamp according to the present invention.

Turning now to FIG. 4, it will be appreciated that the lamp 20 has a major filament 21 electrically connected to the control circuit 30 (FIG. 2) by the connection mechanism 40. It can also be seen that under conventional lamp designs, a minor filament 22 will also be disposed within the lamp 20, but under the present invention such a filament is unnecessary. Thus, the brightness of major filament 21 is reduced to simulate operation of the minor filament 22.

FIG. 6 shows variation of the duty cycle for the PWM signal to produce the predetermined parking brightness level and the predetermined turning brightness level. It will be appreciated that these duty cycles can be adjusted to meet the standards of the particular application. The external lighting system may also be used in situations where the turn signal lamp is used as a daytime running lamp (DRL) during daytime hours. At night, the PWM signal would take over and operate as described above. DRL operation can be controlled either through the microcontroller 31 or in a stand-alone unit. Preferably, the connection medium 40 is a single copper wire.

Figure 5:
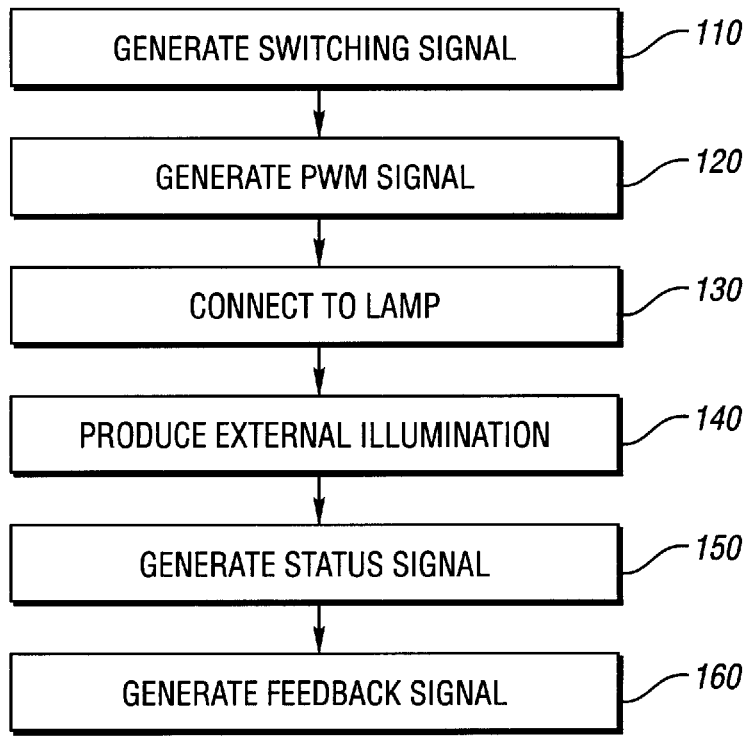
FIG. 5 is a flowchart of a method for producing external illumination for an automobile according to the present invention.

Turning now to FIG. 5, a method 100 for producing external illumination for an automobile is shown for programming purposes. Generally, a PWM signal is generated at step 120 based on a predetermined brightness level. The PWM signal is electrically connected to an external lamp of the vehicle at step 130, and at step 140 external illumination is produced based on the PWM signal. When a predetermined parking brightness level is desired, the above steps are all that are necessary. When the operator desires a predetermined turning brightness level, it can be seen that at step 110 a switching signal is generated in response to an operator manipulation, and generation of the PWM is controlled in response to the switching signal. It is also preferred that at step 150 a status signal is generated based on an operational condition of the lamp, and a feedback signal is generated based on the status signal at step 160.

The invention has been described with reference to a detailed description of a preferred embodiment for the sake of example only. The scope of the invention is to be determined by proper interpretation of the appended claims.

What is claimed is:

1. An automotive external lighting system comprising:

a control circuit for generating variable brightness signals based on predetermined brightness levels;

an external lamp having a major filament and an unused minor filament; and a connection mechanism for electrically connecting the control circuit to the major filament of the external lamp such that the variable brightness signals enable the major filament to selectively produce turning and parking external illumination having the predetermined brightness levels;

said unused minor filament having an end that is intentionally disconnected from the control circuit such that the lighting system has reduced wiring requirements.

2. The lighting system of claim 1 wherein the brightness signal is a pulse width modulated signal, the control circuit including:

a microcontroller for generating the pulse width modulated signal; and a driver for driving the lamp in response to the pulse width modulated signal.

3. The lighting system of claim 2 wherein the pulse width modulated signal has a duty cycle corresponding to a predetermined parking brightness level.

4. The lighting system of claim 2 wherein the pulse width modulated signal has a duty cycle corresponding to a predetermined turning brightness level, the control circuit further including a turn signal switching circuit for generating a switching signal in response to an operator manipulation, the microcontroller controlling generation of the pulse width modulated signal in response to the switching signal.

5. The lighting system of claim 2 wherein the driver generates a status signal based on an operational condition of the lamp, the control circuit further including a feedback logic circuit for providing the microcontroller with a feedback signal based on the status signal.

6. The lighting system of claim 1 wherein the connection mechanism is a single wire.

7. The lighting system of claim 1 wherein the lamp is a turn signal lamp.

8. The lighting system of claim 1 wherein the lamp is a clearance lamp.

9. An automotive external lighting system comprising:

a control circuit for generating a pulse width modulated signal based on a predetermined brightness level, the predetermined brightness level being selectable between a turning brightness level and a parking brightness level;

a turn signaling lamp having a major filament and an unused minor filament; and a single wire for electrically connecting the control circuit to the major filament of the turn signaling lamp such that the pulse width modulated signal enables the major filament to produce external illumination having the predetermined brightness level;

said unused minor filament having an end that is intentionally disconnected from the control circuit such that the lighting system has reduced wiring requirements.

10. The illumination system of claim 9 wherein the control circuit further includes a turn signal switching circuit for generating a switching signal in response to an operator manipulation.

* * * * *